United States Patent
Schnieders et al.

(10) Patent No.: US 12,452,896 B2
(45) Date of Patent: Oct. 21, 2025

(54) ASSIGNING A SERVICE QUALITY TO A WIRELESS CONNECTION

(71) Applicant: Deutsche Telekom AG, Bonn (DE)

(72) Inventors: Dominik Schnieders, Aachen (DE); Marc Geitz, Hagen (DE)

(73) Assignee: DEUTSCHE TELEKOM AG, Bonn (DE)

( * ) Notice: Subject to any disclaimer, the term of this patent is extended or adjusted under 35 U.S.C. 154(b) by 886 days.

(21) Appl. No.: 17/505,671

(22) Filed: Oct. 20, 2021

(65) Prior Publication Data

US 2022/0124738 A1   Apr. 21, 2022

(30) Foreign Application Priority Data

Oct. 21, 2020   (EP) ..................................... 20203124

(51) Int. Cl.
*H04W 72/54* (2023.01)

(52) U.S. Cl.
CPC ................... *H04W 72/54* (2023.01)

(58) Field of Classification Search
None
See application file for complete search history.

(56) References Cited

U.S. PATENT DOCUMENTS

| | | | |
|---|---|---|---|
| 8,335,499 B1 | 12/2012 | Zhao et al. | |
| 2002/0044529 A1* | 4/2002 | Giroux | H04Q 11/0478 370/232 |
| 2017/0280474 A1* | 9/2017 | Vesterinen | H04W 28/22 |
| 2017/0332282 A1* | 11/2017 | Dao | H04L 1/0002 |
| 2019/0261392 A1* | 8/2019 | Morris | H04W 72/21 |
| 2021/0144189 A1* | 5/2021 | Klejsa | H04L 65/80 |
| 2022/0174002 A1* | 6/2022 | Yunoki | H04L 45/302 |

FOREIGN PATENT DOCUMENTS

| | | |
|---|---|---|
| EP | 3697160 A1 | 8/2020 |
| WO | WO 2020165316 A1 | 8/2020 |

* cited by examiner

*Primary Examiner* — Mohammad S Adhami
(74) *Attorney, Agent, or Firm* — LEYDIG, VOIT & MAYER, LTD.

(57) ABSTRACT

A method for assigning a service quality of a radio access network to a wireless connection includes: establishing, by a mobile application, the wireless connection to an application backend via an access node of the radio access network; and assigning, by a scheduler of the radio access network, the service quality of the radio access network to the established wireless connection. The mobile application transmits a quality function to the radio access network. The scheduler assigns the service quality depending on the transmitted quality function.

18 Claims, 6 Drawing Sheets

|     | $B_5$ | $B_4$ | $B_3$ | $B_2$ | $B_1$ | $B_0$ |
|-----|-------|-------|-------|-------|-------|-------|
| $L_5$ | 1  | 2  | 3  | 4  | 5  | 6  |
| $L_4$ | 7  | 8  | 9  | 10 | 11 | 12 |
| $L_3$ | 13 | 14 | 15 | 16 | 17 | 18 |
| $L_2$ | 19 | 20 | 21 | 22 | 23 | 24 |
| $L_1$ | 25 | 26 | 27 | 28 | 29 | 30 |
| $L_0$ | 31 | 32 | 33 | 34 | 35 | 36 |

Fig. 6 A

|     | $B_5$ | $B_4$ | $B_3$ | $B_2$ | $B_1$ | $B_0$ |
|-----|-------|-------|-------|-------|-------|-------|
| $L_5$ | 1  | 7  | 13 | 19 | 25 | 31 |
| $L_4$ | 2  | 8  | 14 | 20 | 26 | 32 |
| $L_3$ | 3  | 9  | 15 | 21 | 27 | 33 |
| $L_2$ | 4  | 10 | 16 | 22 | 28 | 34 |
| $L_1$ | 5  | 11 | 17 | 23 | 29 | 35 |
| $L_0$ | 6  | 12 | 18 | 24 | 30 | 36 |

| | $B_5$ | $B_4$ | $B_3$ | $B_2$ | $B_1$ | $B_0$ |
|---|---|---|---|---|---|---|
| $L_5$ | 1 | 2 | 5 | 10 | 20 | 25 |
| $L_4$ | 3 | 4 | 6 | 11 | 21 | 30 |
| $L_3$ | 7 | 8 | 9 | 14 | 22 | 31 |
| $L_2$ | 12 | 13 | 15 | 16 | 23 | 32 |
| $L_1$ | 17 | 18 | 19 | 29 | 25 | 34 |
| $L_0$ | 26 | 27 | 28 | 33 | 35 | 36 |

| | $B_5$ | $B_4$ | $B_3$ | $B_2$ | $B_1$ | $B_0$ |
|---|---|---|---|---|---|---|
| $L_5$ | $C_1$ | $C_2$ | $C_3$ | $C_4$ | $C_5$ | $C_6$ |
| $L_4$ | $C_7$ | $C_8$ | $C_9$ | $C_{10}$ | $C_{11}$ | $C_{12}$ |
| $L_3$ | $C_{13}$ | $C_{14}$ | $C_{15}$ | $C_{16}$ | $C_{17}$ | $C_{18}$ |
| $L_2$ | $C_{19}$ | $C_{20}$ | $C_{21}$ | $C_{22}$ | $C_{23}$ | $C_{24}$ |
| $L_1$ | $C_{25}$ | $C_{26}$ | $C_{27}$ | $C_{28}$ | $C_{29}$ | $C_{30}$ |
| $L_0$ | $C_{31}$ | $C_{32}$ | $C_{33}$ | $C_{34}$ | $C_{35}$ | $C_{36}$ |

Fig. 7

ASSIGNING A SERVICE QUALITY TO A WIRELESS CONNECTION

CROSS-REFERENCE TO PRIOR APPLICATIONS

This application claims benefit to European Patent Application No. EP 20 203 124.1, filed on Oct. 21, 2020, which is hereby incorporated by reference herein.

FIELD

The invention relates to a method for assigning a service quality of a radio access network to a wireless connection, comprising the steps: a mobile application establishes a wireless connection to an application backend via an access node of a radio access network; and a scheduler of the radio access network assigns a service quality of the radio access network to the established wireless connection. Further, the invention relates to an access node of a mobile communication network and a computer program product for an access node of a radio access network.

BACKGROUND

A mobile application is executed by a user equipment (UE), e.g. a mobile device like a smartphone, and communicates with a corresponding application backend accessible via a radio access network (RAN) in many cases. For communicating with the application backend the mobile application establishes a wireless connection to the application backend via an access node of the radio access network.

The wireless connection uses spectral resources of the radio access network which are allocated to the wireless connection by a scheduler of the access node. Usually, the spectral resources of the radio access network are allocated according to a best effort system. However, the spectral resources may also be allocated according to a service quality (Quality of Service, QoS) which, for example, may be associated with a mobile tariff.

As the spectral requirement of the mobile application may vary during execution, the scheduler has to repeatedly adjust the spectral resources allocated to the wireless connection for ensuring a sufficient operational quality of the mobile application.

The mobile application may, however, at least temporarily suffer from a poor operational quality when a plurality of mobile applications with respective varying spectral requirements are connected to the access node and the spectral resources of the radio access network are not allocated optimally among the plurality of mobile applications.

SUMMARY

In an exemplary embodiment, the present invention provides a method for assigning a service quality of a radio access network to a wireless connection. The method includes: establishing, by a mobile application, the wireless connection to an application backend via an access node of the radio access network; and assigning, by a scheduler of the radio access network, the service quality of the radio access network to the established wireless connection. The mobile application transmits a quality function to the radio access network. The scheduler assigns the service quality depending on the transmitted quality function.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 6A schematically shows a first quality matrix of a mobile application being executed by a user equipment being connected to the radio access network shown in FIG. 1;

FIG. 6B schematically shows a second quality matrix of a mobile application being executed by a user equipment being connected to the radio access network shown in FIG. 1;

FIG. 6C schematically shows a third quality matrix of a mobile application being executed by a user equipment being connected to the radio access network shown in FIG. 1;

FIG. 7 schematically shows a cost matrix of a mobile application corresponding to the first quality matrix shown in FIG. 6A.

DETAILED DESCRIPTION

Figure 1:
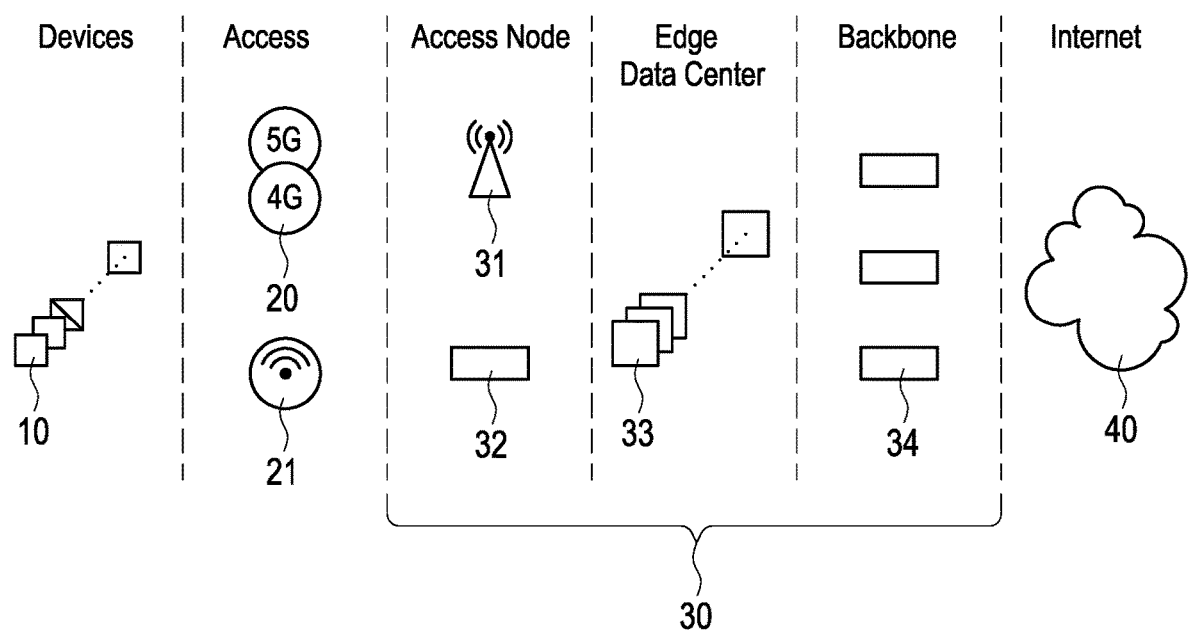
FIG. 1 schematically shows a structural diagram of a radio access network according to an embodiment of the invention.

Exemplary embodiments of the invention provide a method for assigning a service quality of a radio access network to a wireless connection which ensures a best possible operation of a mobile application and each further mobile application being connected to an access node of the radio access network. Further exemplary embodiments of the invention provide an access node of a radio access network and a computer program product for an access node of a radio access network.

A first aspect of the invention is a method for assigning a service quality of a radio access network to a wireless connection, comprising the steps: a mobile application establishes a wireless connection to an application backend via an access node of a radio access network; and a scheduler of the radio access network assigns a service quality of the radio access network to the established wireless connection. These steps are widely carried out by mobile applications being executed by user equipment (UE) devices, e.g. smartphones and the like, and schedulers of existing radio access networks, e.g. mobile communication networks, in order to allow the mobile applications for communicating with respective application backends accessible via the radio access networks.

According to the invention the mobile application transmits a quality function to the radio access network and the scheduler assigns the service quality depending on the transmitted quality function. The quality function may be transmitted to the radio access network when establishing the wireless connection or in advance, i.e. before establishing the wireless connection. For instance, the quality function may be transmitted to the radio access network when the mobile application is executed for the first time. The quality function defines a dependency of an operational quality of the mobile application on the service quality of the radio access network. In other words, the quality function lets the scheduler know which operational quality the mobile application achieves with a particular service quality of the radio access network.

The application may transmit a plurality of quality functions, each quality function depending on a different parameter of the service quality. Or the application may transmit a single quality function depending on a plurality of different parameters of the service quality. The quality function enables the scheduler to assign the service quality appropriately for a predetermined operational quality of the mobile application. Thus, transmitting the quality function allows for a best possible operational quality of the mobile application and a best possible collective operational quality of all mobile applications each being wirelessly connected to the access node.

In many embodiments, a minimum data rate and/or a maximum latency for uplink and downlink, respectively, are assigned as a parameter of the service quality. Allocating a minimum data rate to the wireless connection prevents the wireless connection from being too narrow while allocating a maximum latency to the wireless connection prevents the wireless connection from being too delayed with respect to the requirements of the mobile application for a normal operation.

A predefined combination of a minimum data rate and a maximum latency for uplink and downlink, respectively, may be assigned as the service quality. A specification of a radio communication protocol may define a plurality of predetermined combinations of a minimum data rate value and a maximum latency value. The combinations may cover a range from a practical non-availability to an ideal availability of a data rate and/or latency and may prefer either the data rate or the latency between the non-availability and the ideal availability.

The quality function may be transmitted as a quality matrix with discrete latency values as row indices of the quality matrix, discrete data rate values as column indices of the quality matrix and quality indices as matrix elements of the quality matrix. The quality matrix is a two-dimensional object and represents a quality function that is both data rate-dependent and latency-dependent. The quality matrix, hence, is a very efficient way of covering the two important parameters of the service quality. A quality "matrix" combining more than two parameters of the service quality may also be used.

In these embodiments, a plurality of quality combinations is created by combining a discrete data rate value with a discrete latency value, and the quality indices are created by ranking the created quality combinations according to the respective operational quality of the mobile application. In other words, quality values indicating the operation of the mobile application are determined for each combination and ordered from the highest quality value indexed with 1 to the lowest quality value indexed with the highest index. The quality values may be measured empirically or simulated numerically.

Advantageously, a plurality of equidistant discrete quality values is selected from a quality range from a zero quality to a saturation quality and indexed, and both a discrete data rate value and a discrete latency value are determined for each selected discrete quality value by deploying the inverse of the quality function and indexed corresponding to the selected discrete quality value. The saturation quality cannot be substantially increased by allocating more spectral resources while the mobile application requires at least the spectral resources allowing for the zero quality of the operation and is not operational with less spectral resources. Discretizing the quality function reduces the amount of data to transmit or can be used to establish the quality matrix.

A data rate-dependent quality function is preferably established over a data rate range from a minimum functional data rate related to the zero quality to a saturation data rate related to the saturation quality and a latency-dependent quality function is established over a latency range from a saturation latency related to the saturation latency to a maximum functional latency related to the zero quality. The data rate-dependent quality function and the latency-dependent quality function cover a data rate range and a latency range, respectively, the operational quality of the mobile application varies within from zero to saturation.

The scheduler may determine a cost value for each element of the quality matrix according to a combination of the discrete data rate value and the discrete latency value of the matrix element and establishes a cost matrix of the mobile application corresponding to the quality matrix. In the case of Long Term Evolution (LTE), for instance, resource elements (RE) are the physical units to be considered as costs of a wireless connection. A resource element is a subcarrier of an orthogonal frequency division multiplex (OFDM) symbol which is defined in a frequency range of 15 kHz and has a duration of 66.67 µs. A resource block (RB) combines a plurality of resource elements, e.g. 12 or 24, and is the smallest unit to be allocated to a wireless connection as the spectral resource. Different radio technology standards, e.g. 5G, use similar concepts for quantifying a spectral resource of a radio access network.

The number of resource blocks for ensuring a minimum data rate depends from the signal-to-interference plus noise ratio (SINR) of the access node and may be measured as a so-called channel quality indicator (CQI). The channel quality indicators have to be reduced by connection overhead like signaling, forwarding error correction, retransmissions and the like. The service quality or channel quality has to be sufficiently high for allowing a packet transmission with an instantaneous bit rate, wherein the instantaneous bit rate is given as eight times the packet size in byte divided by the latency in seconds. Accordingly, the cost value for an element of the quality matrix may be calculated as a relation of the resource blocks required for a determined service quality to the resource blocks being totally provided by the access node of the radio access network, i.e. the spectral capacity of the radio cell established by the access node. With this definition each cost value is in a range from zero to one.

An optimization service being requested by the scheduler preferably determines a minimum of an overall cost function, the overall cost function summing a plurality of cost values, each cost value being an element of the cost matrix of a mobile application being connected to the access node. In other words, the overall cost function comprises a cost matrix for each mobile application being wirelessly connected to the access node. Accordingly, at the determined minimum of the overall cost function both the service quality of the mobile application and a collective service quality of all mobile applications being connected to the access node are optimal. The optimization service may be provided by an edge data center and may control an optimizer to solve the corresponding minimization problem. With a very efficient optimization service and/or optimizer service qualities may be reassigned and spectral resources may be reallocated by the scheduler at least near-time.

In some embodiments, the scheduler reallocates spectral resources from a further mobile application to the mobile application in order to protect the mobile application from a poor operational quality. This case may occur when the mobile application suffers from a lowered operational quality, i.e. spectral resources are removed from the wireless connection.

Alternatively or additionally, the scheduler reallocates spectral resources from a further mobile application to the mobile application when the mobile application requests a higher operational quality. This case may occur when the communication between the mobile application and the application backend requires a higher data rate and/or a lower latency due to a change of state.

The spectral resources may be reallocated when a collective operational quality of all mobile applications does not fall below a predetermined collective operational quality threshold after the reallocation. The collective operational quality threshold prevents a poor operational quality of a plurality of mobile application to the benefit of few mobile applications being connected to the access node.

Optionally, the scheduler transmits the assigned service quality to the mobile application in-band or out-of-band. In-band, the parameters of the service quality may be transmitted as enum values which may be coded in DiffServ Bits. Out-of-band, the quality indices may be transmitted as key-value pairs. Key-value pairs are, for instance, used for JSON objects.

Another aspect of the invention is an access node of a radio access network with a scheduler. Access nodes having a scheduler are widely used by radio access networks. Consequently, there are many scenarios for applying the invention.

According to the invention the scheduler is configured for carrying out a method according to the invention. Due to the configuration the scheduler ensures a best possible operation of the mobile application and all mobile applications being connected to the access node at the same time which improves a user experience (UX) when executing the mobile application on the user equipment.

A third aspect of the invention is a computer program product for an access node of a radio access network, comprising a non-transitory computer readable storage medium storing a program code, the program code being executable by a scheduler of the access node. The computer program product may be a CD, a DVD, a USB stick and the like. The computer program product may also be a memory chip, a hard drive, a cloud server, a repository, an image, a file share and the like. The program code stored on the computer program product may be executable by the scheduler of the access node of the radio access network.

According to the invention the program code causes the scheduler to carry out a method according to the invention when being executed by a processor of the access node. The program code improves the operation of the scheduler regarding the assignment of a service quality and an allocation of spectral resources of a radio access network.

In exemplary embodiments of the invention, spectral resources of a radio access network may be allocated to a plurality of mobile applications connected to an access node of the radio access network, thereby allowing both a possible best operation of a single mobile application and a possible best operation of the plurality of mobile application. In other words, an individual requirement for service quality, i.e. spectral resources, may be optimally balanced with a collective requirement for service quality, i.e. spectral resources. As a consequence, a satisfactory operation of a mobile application requiring a particularly large data rate and/or a particularly small latency is guaranteed even when a plurality of mobile applications are simultaneously connected to the access node which improves a user experience of the radio access network. Additionally, a mobile network operator (MNO) might create new business models being based on a service quality, i.e. a quality of service (QoS).

Further advantages and configurations of the invention become apparent from the following description and the enclosed drawings.

It shall be understood that the features described previously and to be described subsequently may be used not only in the indicated combinations but also in different combinations or on their own without leaving the scope of the present invention.

The invention is described in detail via exemplary embodiments and with reference to the drawings.

FIG. 1 schematically shows a structural diagram of a radio access network 30 according to an embodiment of the invention. The radio access network 30 comprises a plurality of access nodes 31, 32 with the access node 31 being configured as a base station or a NodeB of a cellular communication network and the access node 32 being configured as a W-LAN router. Each access node 31, 32 supports corresponding wireless connections 20, 21, the wireless connection 20 being configured according to a standardized radio technology, i.e. LTE, 5G, a previous or a future radio technology standard and the wireless connection 21 being configured according to the standard IEEE 802.11 family.

Furthermore, the radio access network 30 comprises a plurality of edge data centers 33 and a backbone, i.e. a core, having a plurality of stationary backbone nodes 34. The radio access network 30 provides wireless connections to a plurality of user equipment devices 10, the wireless connections allowing the user equipment (UE) devices 10 to access the edge data center 33 or an internet 40, the latter being symbolized as a cloud.

Each access node 31, 32 of the radio access network 30 establishes a radio cell of the radio access network 30 and comprises a scheduler for assigning a service quality and allocating a spectral resource of the radio access network to a mobile application being executed by the user equipment 10 and being connected to the radio access network 30. The edge data center 33 or the internet 40 may comprise and execute an application backend for the mobile application.

The access node 31, 32 may be configured by a computer program product for the access node 31, 32 of the radio access network 30. The computer program product comprises a non-transitory computer readable storage medium storing a program code. The program code is executable by the scheduler of the access node 31, 32 and causes the scheduler to carry out the following method for allocating a spectral resource of the radio cell of the radio access network 30 to the mobile application when being executed by a processor the access node.

When the mobile application establishes a wireless connection 20, 21 to the application backend via the access node 31, 32 of the radio access network 30, the mobile application may transmit a quality function 130, 131, 132, 133, 230, 231, 232, 233 (FIGS. 2A to 2D, 3A to 3D) defining a dependency of an operational quality of the mobile application on a service quality of the radio access network 30. The mobile application may transmit the quality function as a quality matrix 300, 400, 500 (see FIGS. 6A to 6C) when establishing the wireless connection 20, 21.

The scheduler receives the transmitted quality function 130, 131, 132, 133, 230, 231, 232, 233 or the transmitted quality matrix 300, 400, 500 and assigns a service quality of the radio access network 30 to the established wireless connection 20, 21 depending on the transmitted quality function 130, 131, 132, 133, 230, 231, 232, 233 or the transmitted quality matrix 300, 400, 500. A minimum data rate and/or a maximum latency for uplink and downlink, respectively, may be assigned as a parameter of the service quality. Preferably, a predefined combination of a minimum data rate and a maximum latency for uplink and downlink, respectively, is assigned as the service quality. The scheduler may transmit the assigned service quality to the mobile application in-band or out-of-band.

The quality function may be chosen to be data rate-dependent quality function 130, 131, 132, 133 (FIGS. 2A to 2D). The data rate-dependent quality function 130, 131, 132, 133 is established over a data rate range from a minimum functional data rate 111 related to a zero quality 121 to a saturation data rate 112 related to a saturation quality 122.

Figure 2:
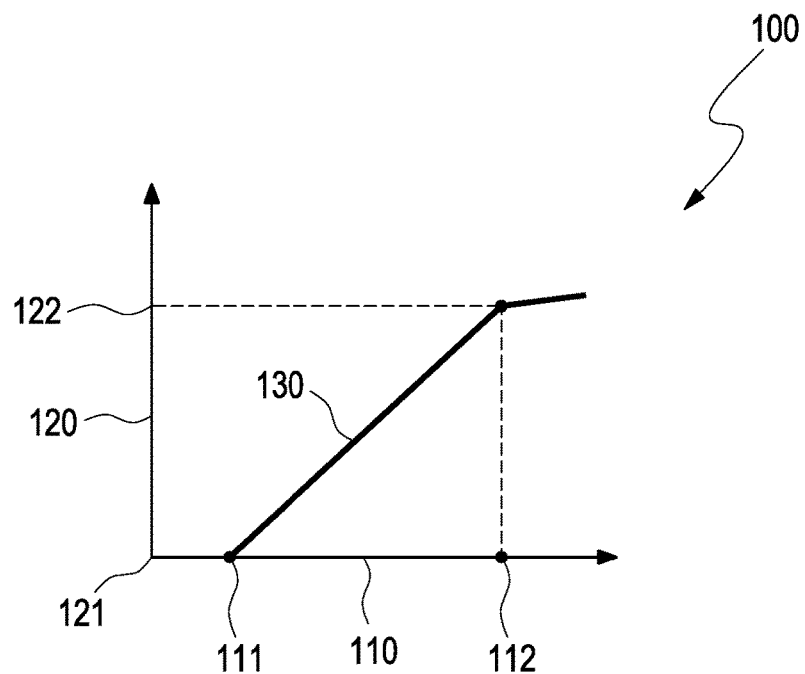
FIG. 2A schematically shows a graph with a first data rate-dependent quality function of a mobile application being executed by a user equipment being connected to the radio access network shown in FIG. 1.
FIG. 2B schematically shows a graph with a second data rate-dependent quality function of a mobile application being executed by a user equipment being connected to the radio access network shown in FIG. 1.
FIG. 2C schematically shows a graph with a third data rate-dependent quality function of a mobile application being executed by a user equipment being connected to the radio access network shown in FIG. 1.
FIG. 2D schematically shows a graph with a fourth data rate-dependent quality function of a mobile application being executed by a user equipment being connected to the radio access network shown in FIG. 1.
Figure 2:
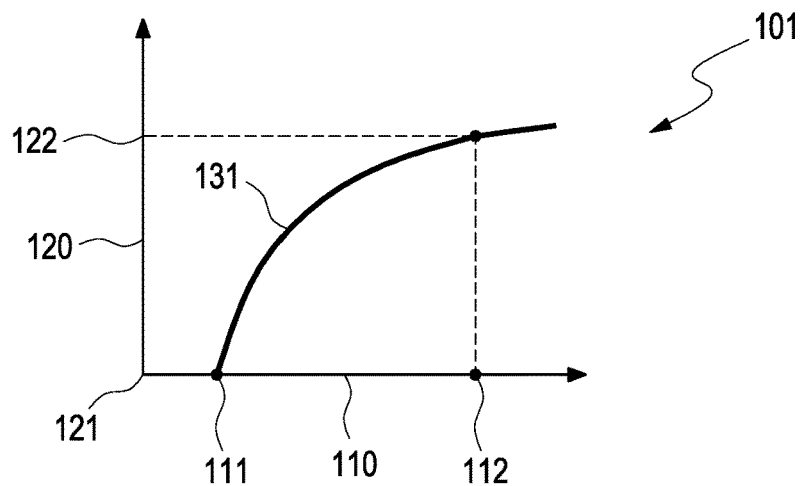
Figure 2:
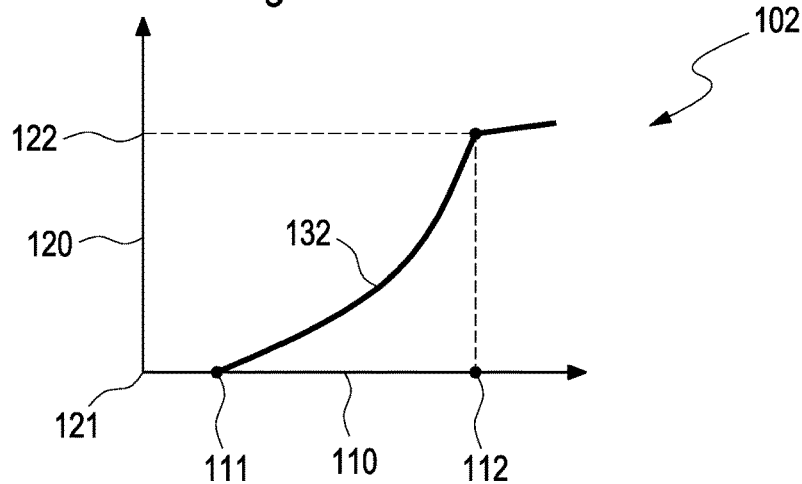
Figure 2:
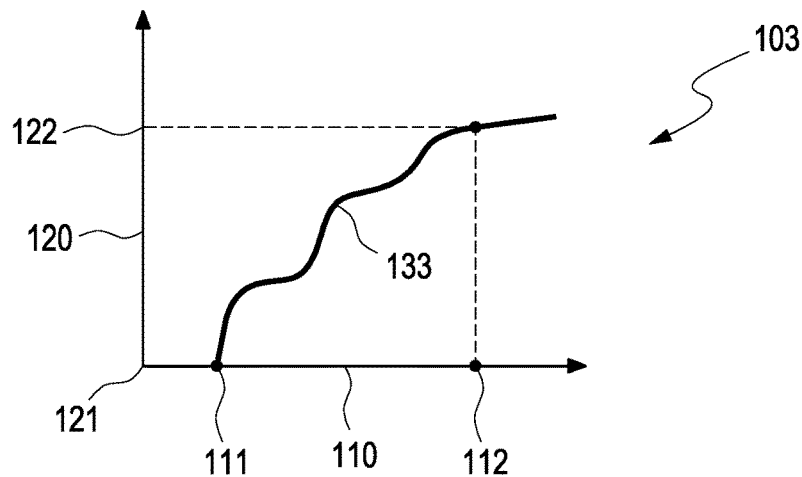

FIG. 2A schematically shows a graph 100 with a first data rate-dependent quality function 130 of a mobile application being executed by a user equipment 10 being connected to the radio access network 30 shown in FIG. 1. The graph 100 comprises an abscissa 110 indicating an increasing data rate and an ordinate 120 indicating an increasing quality of the operation of the executed application. The first data rate-dependent quality function 130 starts from the minimum functional data rate 111 and increases substantially linearly until reaching the saturation data rate 112. The value of the first data rate-dependent quality function 130 at the minimum functional data rate 111 is set to zero, i.e. related to the zero quality 121. The value of the first data rate-dependent quality function 130 at the saturation data rate 112 is related to the saturation quality 122. The first data rate-dependent quality function 130 is substantially constant above the saturation data rate 112, i.e. data rates greater than the saturation data rate 112 do not substantially improve the quality of the operation of the executed mobile application.

FIG. 2B schematically shows a graph 101 with a second data rate-dependent quality function 131 of a mobile application being executed by a user equipment 10 being connected to the radio access network 30 shown in FIG. 1. The graph 101 is structurally similar to the graph 100 shown in FIG. 2A. However, the second data rate-dependent quality function 131 differs from first data rate-dependent quality function 130 by the functional course between the minimum functional data rate 111 and the saturation data rate 112, the functional course being right-curved.

FIG. 2C schematically shows a graph 102 with a third data rate-dependent quality function 132 of a mobile application being executed by a user equipment 10 being connected to the radio access network 30 shown in FIG. 1. The graph 102 is structurally similar to the graphs 100, 101 shown in FIGS. 2A, 2B, respectively. However, the third data rate-dependent quality function 132 differs from first data rate-dependent quality function 130 and the second data rate-dependent quality function 131 by the functional course between the minimum functional data rate 111 and the saturation data rate 112, the functional course being left-curved.

FIG. 2D schematically shows a graph 103 with a fourth data rate-dependent quality function 133 of a mobile application being executed by a user equipment 10 being connected to the radio access network shown in FIG. 1. The graph 103 is structurally similar to the graphs 100, 101, 102 shown in FIGS. 2A, 2B, 2C, respectively. However, the fourth data rate-dependent quality function 133 differs from first data rate-dependent quality function 130, the second data rate-dependent quality function 131 and the third data rate-dependent quality function 132 by the functional course between the minimum functional data rate 111 and the saturation data rate 112, the functional course having a plurality of turnings.

The quality function may be chosen to be a latency-dependent quality function 230, 231, 232, 233 (FIGS. 3A to 3D). The latency-dependent quality function 230, 231, 232, 233 is established over a latency range from a saturation latency 211 related to the saturation quality 222 to a maximum functional latency 212 related to the zero quality 221.

Figure 3:
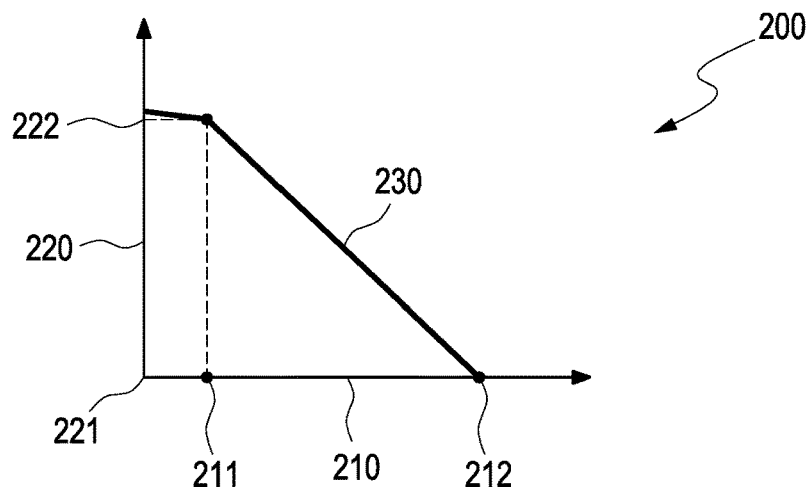
FIG. 3A schematically shows a graph with a first latency-dependent quality function of a mobile application being executed by a user equipment being connected to the radio access network shown in FIG. 1.
FIG. 3B schematically shows a graph with a second latency-dependent quality function of a mobile application being executed by a user equipment being connected to the radio access network shown in FIG. 1.
FIG. 3C schematically shows a graph with a third-latency dependent quality function of a mobile application being executed by a user equipment being connected to the radio access network shown in FIG. 1.
FIG. 3D schematically shows a graph with fourth latency-dependent quality function of a mobile application being executed by a user equipment being connected to the radio access network shown in FIG. 1.
Figure 3:
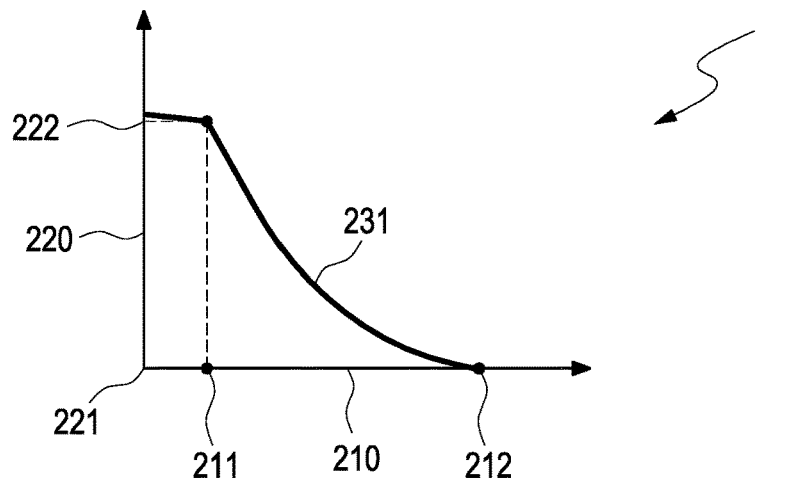
Figure 3:
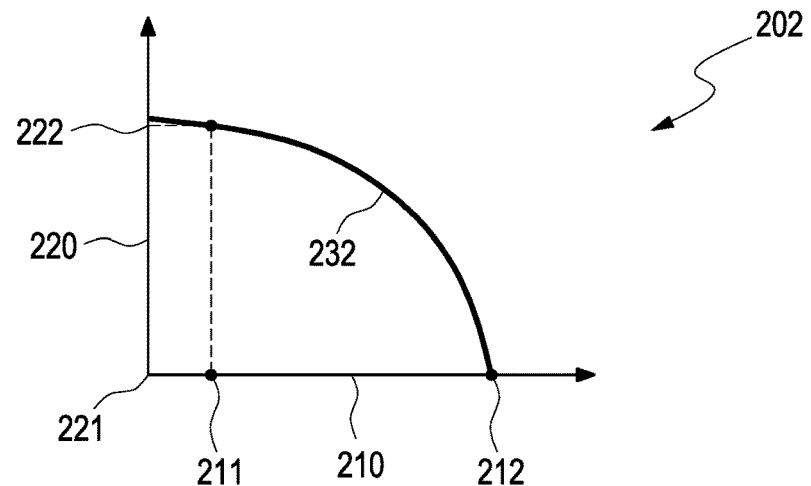
Figure 3:
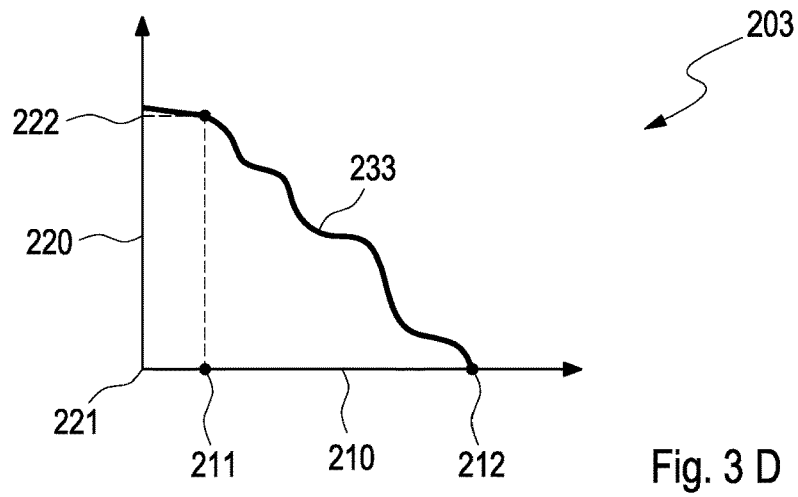

FIG. 3A schematically shows a graph 200 with a first latency-dependent quality function 230 of a mobile application being executed by a user equipment 10 being connected to the radio access network 30 shown in FIG. 1. The graph 200 comprises an abscissa 210 indicating an increasing latency and an ordinate 220 indicating an increasing quality of the operation of the executed application. The first latency-dependent quality function 230 starts from the saturation latency 211 and decreases substantially linearly until reaching the maximum functional latency 212. The value of the first latency-dependent quality function 230 at the saturation latency 211 is related to the saturation latency 222. The value of the first latency-dependent quality function 230 at the maximum functional latency 212 is set to zero, i.e. related to the zero quality 221. The first latency dependent quality function 230 is substantially constant below the saturation latency 211, i.e. latencies smaller than the saturation latency 211 do not substantially improve the quality of the operation of the executed application.

FIG. 3B schematically shows a graph 201 with a second latency-dependent quality function 231 of a mobile application being executed by a user equipment 10 being connected to the radio access network 30 shown in FIG. 1. The graph 201 is structurally similar to the graph 200 shown in FIG. 3A. However, the second data rate-dependent quality function 231 differs from first data rate-dependent quality function 230 by the functional course between the saturation latency 211 and the maximum functional latency 212, the functional course being left-curved.

FIG. 3C schematically shows a graph 202 with a third-latency dependent quality function 232 of a mobile application being executed by a user equipment 10 being connected to the radio access network 30 shown in FIG. 1. The graph 202 is structurally similar to the graphs 200, 201 shown in FIGS. 3A, 3B, respectively. However, the third latency-dependent quality function 232 differs from first latency-dependent quality function 230 and the second latency-dependent quality function 231 by the functional course between the saturation latency 211 and the maximum functional latency 212, the functional course being right-curved.

FIG. 3D schematically shows a graph 203 with fourth latency-dependent quality function 233 of a mobile application being executed by a user equipment 10 being connected to the radio access network 30 shown in FIG. 1. The graph 203 is structurally similar to the graphs 200, 201, 202 shown in FIGS. 3A, 3B, 3C, respectively. However, the fourth data rate-dependent quality function 233 differs from first latency-dependent quality function 230, the second latency-dependent quality function 231 and the third latency-dependent quality function 232 by the functional course between the saturation latency 211 and the maximum functional latency 212, the functional course having a plurality of turnings.

In case the quality function 130, 131, 132, 133, 230, 231, 232, 233 is transmitted as a quality matrix 300, 400, 500 (see FIGS. 6A to 6C), a plurality of equidistant discrete quality values 123, 223 (FIGS. 4, 5) may be selected from a quality range from the zero quality 121, 221 to the saturation quality 122, 222 and indexed and both a discrete data rate 113 value and a discrete latency value 213 are determined for each selected discrete quality value 123, 223 by deploying the inverse of the quality function 130, 131, 132, 133, 230, 231, 232, 233 and indexed corresponding to the selected discrete quality value 123, 223.

Figure 4:
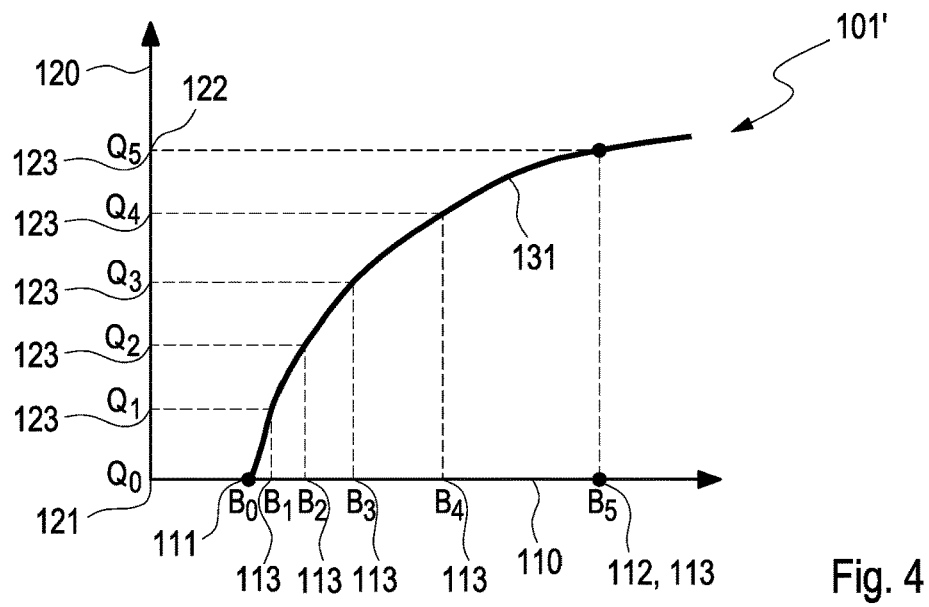
FIG. 4 schematically shows a graph with discretized values of the data rate-dependent quality function shown in FIG. 2B.

FIG. 4 schematically shows a graph 101' with discrete values 113, 123 of the data rate-dependent quality function 131 shown in FIG. 2B. Six equidistant discrete quality values Q0, Q1, Q2, Q3, Q4, Q5 are selected from the quality range from the zero quality 121 to the saturation quality 122, wherein Q0 is the zero quality 121 and Q5 is the saturation quality 122. The six quality values Q0, Q1, Q2, Q3, Q4, Q5 are mapped to six discrete data rate values B0, B1, B2, B3, B4, B5, wherein B0 is the minimum functional data rate and B5 is the saturation data rate.

Figure 5:
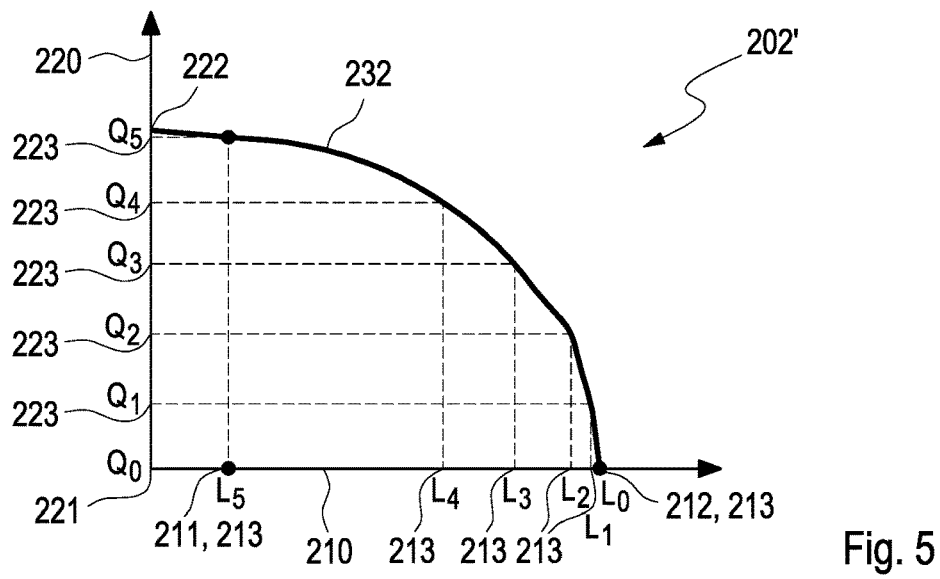
FIG. 5 schematically shows a graph with discretized values of the latency-dependent quality function shown in FIG. 3C.

FIG. 5 schematically shows a graph 202' with discrete values 213, 223 of the latency-dependent quality function 232 shown in FIG. 3C. The six quality values Q0, Q1, Q2, Q3, Q4, Q5 are mapped to six discrete data rate values L0, L1, L2, L3, L4, L5, wherein L0 is the maximum functional latency and L5 is the saturation latency.

The quality matrix 300, 400, 500 (see FIGS. 6A to 6C) combines the data rate-dependent quality function and the latency-dependent quality function and has the discrete latency values 213 as row indices of the quality matrix 300, 400, 500 and the discrete data rate values 113 as column indices of the quality matrix 300, 400, 500 and quality indices 301, 401, 501 as matrix elements of the quality matrix 300, 400, 500.

The quality indices 301, 401, 501 are created by ranking a plurality of quality combinations according to the respective operational quality of the mobile application wherein each quality combination is created by combining a discrete data rate value 113 with a discrete latency value 213.

FIG. 6A schematically shows a first quality matrix 300 of a mobile application being executed by a user equipment 10 being connected to the radio access network 30 shown in FIG. 1. The row indices are the discrete latency indices L0, L1, L2, L3, L4, L5 while the column indices are the discrete data rate indices B0, B1, B2, B3, B4, B5. The left upper matrix element is indicated by B5, L5 while the right lower matrix element is indicated by B0, L0, i.e. the left upper matrix element indicates best spectral resources for the mobile application while the right lower matrix indicates worst spectral resources for the mobile application. The quality indices 301 increase with a decreasing operational quality of the mobile application, i.e. the quality index "1" indicates the highest operational quality of the mobile application while the quality index "36" indicates the lowest operational quality of the mobile application. The first quality matrix 300 relates to a mobile application which benefits from a small latency more than from a large data rate. Correspondingly, the quality indices 301 increase within each row first.

FIG. 6B schematically shows a second quality matrix 400 of a mobile application being executed by a user equipment 10 being connected to the radio access network 30 shown in FIG. 1. The second quality matrix 400 is structurally similar to the first quality matrix shown in FIG. 6A. The quality matrix 400 relates to a mobile application which benefits from a large data rate more than from a small latency. Correspondingly, the quality indices 401 increase within each column first.

FIG. 6C schematically shows a third quality matrix 500 of a mobile application being executed by a user equipment 10 being connected to the radio access network 30 shown in FIG. 1. The third quality matrix 500 is structurally similar to the first quality matrix 300 and the second quality matrix 400 shown in FIGS. 6A and 6B, respectively. The quality matrix 400 relates to a mobile application which approximately benefits from balanced data rates and latencies more than from unbalanced data rates and latencies. Correspondingly, the quality indices 501 increase with each larger quadratic submatrix.

The scheduler determines a cost value for each element of the quality matrix 300, 400, 500 according to a combination of the discrete data rate value 113 and the discrete latency value 213 of the matrix element depending on the respective required spectral resources and establishes a cost matrix 600 of the mobile application corresponding to the quality matrix 300, 400, 500. The cost value is related to the combination of spectral resources which have to be assigned to the wireless connection for ensuring the respective operational quality of the mobile application.

FIG. 7 schematically shows a cost matrix 600 of a mobile application corresponding to the first quality matrix 300 shown in FIG. 6A.

An optimization service being requested by the scheduler determines a minimum of an overall cost function, the overall cost function summing a plurality of cost values 601 each cost value 601 being an element of the cost matrix 600 of a mobile application being connected to the access node 31, 32.

During normal operation of the access node 31, 32 the scheduler may reallocate spectral resources from a further mobile application to the mobile application in order to protect the mobile application from a poor operational quality. The scheduler may also reallocate spectral resources from a further mobile application to the mobile application when the mobile application requests a higher operational quality. Thereby, the spectral resources are reallocated when a collective operational quality of all mobile applications does not fall below a predetermined collective operational quality threshold after the reallocation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS 10 user equipment device
20 wireless connection
21 wireless connection
30 radio access network
31 access node
32 access node
33 edge data center
34 backbone node
35 trajectory data
40 internet
100 graph
110 abscissa
111 minimum functional data rate
112 saturation data rate
120 ordinate
121 zero quality
122 saturation quality
130 data rate-dependent quality function
101 graph
101' graph
110 abscissa
111 minimum functional data rate
112 saturation data rate
113 discrete data rate value
120 ordinate
121 zero quality
122 saturation quality
123 discrete quality value
131 data rate-dependent quality function
102 graph
110 abscissa
111 minimum functional data rate
112 saturation data rate
120 ordinate
121 zero quality
122 saturation quality
132 data rate-dependent quality function
103 graph
110 abscissa
111 minimum functional data rate
112 saturation data rate
120 ordinate
121 zero quality
122 saturation quality
133 data rate-dependent quality function
200 graph
210 abscissa
211 saturation latency
212 maximum functional latency
220 ordinate
221 zero quality
222 saturation quality
230 latency-dependent quality function
201 graph
210 abscissa
211 saturation latency
212 maximum functional latency
220 ordinate
221 zero quality
222 saturation quality
231 latency-dependent quality function
202 graph
202' graph
210 abscissa
211 saturation latency
212 maximum functional latency
213 discrete latency value
220 ordinate
221 zero quality
222 saturation quality
223 discrete quality value
232 latency-dependent quality function
203 graph
210 abscissa
211 saturation latency
212 maximum functional latency
220 ordinate
221 zero quality
222 saturation quality
233 latency-dependent quality function
300 quality matrix
301 quality index
400 quality matrix
401 quality index
500 quality matrix
501 quality matrix
600 cost matrix
601 cost value

The invention claimed is:

1. A method for assigning a service quality of a radio access network to a wireless connection, comprising:

establishing, by a mobile application, the wireless connection to an application backend via an access node of the radio access network; and assigning, by a scheduler of the radio access network, the service quality of the radio access network to the established wireless connection;

wherein the mobile application transmits a quality function to the radio access network;

wherein the scheduler assigns the service quality depending on the transmitted quality function, wherein the transmitted quality function indicates to the scheduler various levels of operational quality for the mobile application corresponding to various levels of service quality of the radio access network;

wherein the quality function is transmitted as a quality matrix with discrete latency values as row indices of the quality matrix, discrete data rate values as column indices of the quality matrix, and quality indices as matrix elements of the quality matrix; and wherein a plurality of quality combinations is created by combining discrete data rate values with discrete latency values, and the quality indices are created by ranking the created quality combinations according to respective levels of operational quality for the mobile application.

2. The method according to claim 1, wherein a minimum data rate and/or a maximum latency for uplink and downlink, respectively, are assigned as parameters of the service quality.

3. The method according to claim 1, wherein a predefined combination of a minimum data rate and a maximum latency for uplink and downlink, respectively, is assigned as parameters of the service quality.

4. The method according to claim 1, wherein a plurality of equidistant discrete quality values is selected from a quality range from a zero quality to a saturation quality and indexed, and both a discrete data rate value and a discrete latency value are determined for each selected discrete quality value by deploying the inverse of the quality function and indexed corresponding to the selected discrete quality value.

5. The method according to claim 4, wherein a data rate-dependent quality function is established over a data rate range from a minimum functional data rate related to the zero quality to a saturation data rate related to the saturation quality, and a latency-dependent quality function is established over a latency range from a saturation latency related to the saturation quality to a maximum functional latency related to the zero quality.

6. The method according to claim 1, wherein the scheduler determines a cost value for each element of the quality matrix according to a combination of the discrete data rate value and the discrete latency value of the matrix element and establishes a cost matrix of the mobile application corresponding to the quality matrix.

7. The method according to claim 6, wherein an optimization service requested by the scheduler determines a minimum of an overall cost function, the overall cost function summing a plurality of cost values, and each cost value being an element of the cost matrix of a mobile application connected to the access node.

8. The method according to claim 1, wherein the scheduler transmits the assigned service quality to the mobile application in-band or out-of-band.

9. The method according to claim 1, wherein the scheduler reallocates spectral resources from a further mobile application to the mobile application to protect the mobile application from poor operation quality.

10. The method according to claim 9, wherein the spectral resources are reallocated when a collective operation quality of all mobile applications does not fall below a predetermined collective operation quality threshold after the reallocation.

11. The method according to claim 9, wherein the scheduler transmits the assigned service quality to the mobile application in-band or out-of-band.

12. The method according to claim 1, wherein the scheduler reallocates spectral resources from a further mobile application to the mobile application based on the mobile application requesting a higher operation quality.

13. The method according to claim 12, wherein the spectral resources are reallocated when a collective operation quality of all mobile applications does not fall below a predetermined collective operation quality threshold after the reallocation.

14. The method according to claim 12, wherein the scheduler transmits the assigned service quality to the mobile application in-band or out-of-band.

15. An access node of a radio access network, comprising:
a processor; and
a non-transitory memory having processor-executable instructions stored thereon;
wherein the processor is configured to execute the processor-executable instructions to facilitate the following being performed by the access node:
receiving, from a mobile application, a quality function, wherein the mobile application has an established wireless connection to an application backend via the access node, and wherein the received quality function indicates various levels of operational quality for the mobile application corresponding to various levels of service quality of the radio access network; and
assigning, depending on the received quality function, a service quality of the radio access network to the established wireless connection;
wherein the quality function is received as a quality matrix with discrete latency values as row indices of the quality matrix, discrete data rate values as column indices of the quality matrix, and quality indices as matrix elements of the quality matrix; and
wherein a plurality of quality combinations is created by combining discrete data rate values with discrete latency values, and the quality indices are created by ranking the created quality combinations according to respective levels of operational quality for the mobile application.

16. A non-transitory computer-readable medium having processor-executable instructions stored thereon, wherein the processor-executable instructions, when executed, facilitate:
receiving, by a scheduler of a radio access network, a quality function from a mobile application, wherein the mobile application has an established wireless connection to an application backend via an access node, and wherein the received quality function indicates various levels of operational quality for the mobile application corresponding to various levels of service quality of the radio access network; and
assigning, by the scheduler, depending on the received quality function, a service quality of the radio access network to the established wireless connection;
wherein the quality function is received as a quality matrix with discrete latency values as row indices of the quality matrix, discrete data rate values as column indices of the quality matrix, and quality indices as matrix elements of the quality matrix; and wherein a plurality of quality combinations is created by combining discrete data rate values with discrete latency values, and the quality indices are created by ranking the created quality combinations according to respective levels of operational quality for the mobile application.

17. The method according to claim 1, wherein the transmitted quality function includes at least a first quality value of the mobile application corresponding to a first data rate of the radio access network and a second quality value of the mobile application corresponding to a second data rate of the radio access network, wherein the first quality value is higher than the second quality value and the first data rate is higher than the second data rate.

18. The method according to claim 1, wherein the transmitted quality function includes at least a first quality value of the mobile application corresponding to a first latency value of the radio access network and a second quality value of the mobile application corresponding to a second latency value of the radio access network, wherein the first quality value is higher than the second quality value and the first latency value is lower than the second latency value.

* * * * *